Figure 1:
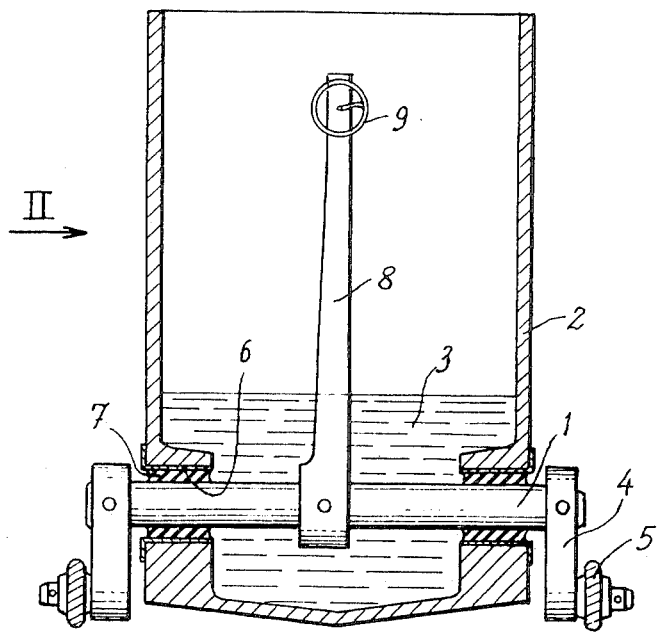

United States Patent [11] 3,628,420

| [72] | Inventors | Raymond Boueil;<br>Marcel Rolland, both of Billancourt, France |
|---|---|---|
| [21] | Appl. No. | 767,252 |
| [22] | Filed | Oct. 14, 1968 |
| [45] | Patented | Dec. 21, 1971 |
| [73] | Assignee | Regie Nationale Des Usines Renault<br>Billancourt, France |
| [32] | Priority | Nov. 24, 1967 |
| [33] | | France |
| [31] | | 129537 |

[54] TRACTIVE STRESS DETECTOR FOR TRACTORS
1 Claim, 2 Drawing Figs.

[52] U.S. Cl. .................................................. 91/367,
74/470, 308/238, 172/7
[51] Int. Cl. ...................................................... G05g 1/00,
A01b 63/112, F15b 13/16
[50] Field of Search ............................................. 73/141 A,
133; 172/7, 9; 308/238; 267/57.1, 57; 91/367;
74/470

[56] References Cited
UNITED STATES PATENTS

| 2,690,335 | 9/1954 | Ballard .......................... | 267/63 |
| 2,915,306 | 12/1959 | Hickman ....................... | 267/57.1 |
| 3,020,036 | 2/1962 | Kleinschmidt................ | 267/1 |
| 3,307,455 | 3/1967 | Peras............................. | 91/367 |
| 2,747,483 | 5/1956 | Gross ............................ | 172/9 |
| 3,130,976 | 4/1964 | Niswander.................... | 308/238 |

*Primary Examiner*—Richard C. Queisser
*Assistant Examiner*—John Whalen
*Attorney*—Stevens, Davis, Miller & Mosher ABSTRACT: Device for detecting tractive stress on farming tractors, which comprises traction rods fulcrumed to levers secured to a rotary shaft mounted in an oil-tight manner in two opposite walls of the rear axle case by means of rubber bushes adhering both to said shaft and to said walls. Said shaft acts upon a distributor controlling the hydraulic raising of the equipment, and an elastic means counteracts the rotation of said shaft urged for rotation by the tractive stress.

PATENTED DEC 21 1971 3,628,420

INVENTORS
RAYMOND BOUEIL,
MARCEL ROLLAND,
By Stevens, Davis, Miller & Mosher
ATTORNEYS

TRACTIVE STRESS DETECTOR FOR TRACTORS

Farming tractors provided with hydraulic systems for positioning the farming equipment as a function of a predetermined tractive stress are equipped with a device designed for determining this tractive stress. Some of these known devices are adapted to measure the force exerted by the equipment on the traction links or rods. These act in turn on external levers secured to a rotary shaft rigid with an inner arm, the movement of which is determined in amplitude by a strong return spring.

The rotary shaft may be mounted in two bearings secured in the rear axle case. These bearings permit the free rotation of said shaft and have obviously to be completed by seals preventing any leakage of the oil contained in the rear axle case.

Obtaining the necessary oil tightness constitutes a difficult problem and the considerable stress exerted on the bearings is attended by an important loss of efficiency which impairs the stress detection sensitivity and also the proper operation of the tractive effort regulation.

The present invention aims at avoiding these inconveniences and is therefore applicable to this type of tractive stress detector on forming tractors provided with equipment pulling links or rods pivoted on levers secured to a rotary shaft extending through two opposite walls of the rear axle case of the tractor and acting through the medium of a transmission member upon a distributor controlling in turn the hydraulic means for raising the framing equipment, resilient means being provided for counteracting the rotation of said shaft when the latter is rotatably urged by tractive stress. This invention is characterized in that the shaft is mounted in an oil-tight manner in two opposite walls of said case by means of a rubber bush or packing adhering both to the shaft and to the adjacent wall.

This bush advantageously consists of a hollow cylinder made of elastomeric material adhering by cementing or vulcanization with its inner surface to said shaft and with its outer surface to said case.

Finally, the use of rubber bushes is also advantageous in that it permits dispensing with any resilient metal member such as a traction spring or a compression spring coacting with pivoted levers. In fact, according to this invention, the necessary return means or force is provided for by said rubber bushes alone.

Figure 2:
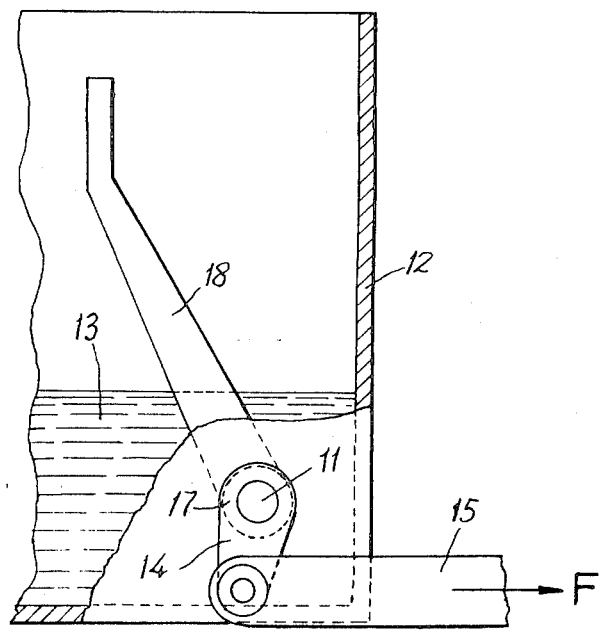

The invention will now be described with reference to the diagrammatic drawing attached hereto and illustrating a typical form of embodiment of the device constituting the subject matter of this invention. In the drawing:

FIG. 1 is a section taken along a vertical plane parallel to the shaft to be sealed, showing one portion of the rear axle case of a tractor; and FIG. 2 is a part-sectional and fragmentary side-elevational view of a second embodiment of the device shown in FIG. 1, as seen in the direction of the arrow II.

As will be seen in the drawing, the device according to this invention comprises a shaft 1 extending transversely through the rear axle case 2 filled with oil 3.

A lever 4 is keyed to each end of shaft 1. A traction rod 5 is pivotally attached to the free end of each lever 4.

In each bore 6 formed in the opposite walls of the axle case 2 and receiving the shaft 1 therethrough a rubber bush 7 of synthetic rubber is cemented. Besides, the inner cylindrical surface of each bush 7 is cemented to the shaft 1.

In the case, an arm 8 is rigidly secured to the shaft 1. A traction spring 9 connects the free end of said arm 8 to case 2 in such a way as to counteract the tractive efforts exerted in the direction of the arrow F on the traction rods 5 (FIG. 2).

Finally, a lever mounted in the case 2 on shaft 1 is connected through a transmission or connecting member to a control member acting upon the slide valve of a distributor controlling in turn the hydraulic equipment raising system. The lever, transmission or connecting members, control member, slide valve, distributor and raising system are not shown in the drawing as they will be apparent from the prior art, for example, U.S. Pat. No. 3,307,455, issued Mar. 7, 1967

As will be seen in the device illustrated the metal bearings and their conventional packing means are replaced according to this invention by rubber bushes ensuring at the same time the free rotation of the rotary shaft and the oil-tightness of the shaft portions emerging from the rear-axle case.

In the example illustrated the inner arm 8 and the return spring 9 remain, and the function of the rubber bushes 7 consists only in sealing the detector shaft 1 and permitting its rotation.

According to a modified form of embodiment the dimensions of said rubber bushes 7 are calculated to enable them to act as resilient, torsion-stressed return means. In this case, the inner arm 8 and return spring 9 of FIG. 1 are dispensed with, the rubber bushes 17 providing at the same time the sealing function, the shaft rotation and the elastic resistance of this shaft 11 to the rotation caused by the effort exerted on the traction rod 15 pivotally attached to each lever 14 keyed onto the end of shaft 11. A member 18 connects the shaft 11 to a control member acting upon the slide valve of the distributor mentioned above but not shown in the drawing.

Of course, if desired the elastomer bushes 17 may also be secured to the case 12 and/or shaft 11 by means of rigid intermediate sockets as illustrated by way of example in FIG. 1.

We claim:

1. In a device for detecting traction stress in farming tractors provided with equipment traction rods pivoted on levers secured to a rotary shaft extending through the walls of a rear axle case of the tractor and acting through the medium of a traction stress transmitting member upon a distributor which in turn controls the hydraulic lifting of the equipment and the traction stress, in a manner dependent upon the angular position of said shaft, a means for mounting said shaft in an oil-tight manner in opposed walls of said case comprising rubber bushes adhering both to said shaft and to said case to exert on the shaft an elastic resistance against the rotation of said shaft caused by the effort exerted on the traction rod by the traction stress, the degree of rotation of said shaft being dependent upon the value of said traction stress.

* * * * *